United States Patent
Drewes (10) Patent No.: US 10,677,302 B2
(45) Date of Patent: Jun. 9, 2020

(54) BRAKE UNIT

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 268 days.

(21) Appl. No.: 15/550,276

(22) PCT Filed: Feb. 12, 2016

(86) PCT No.: PCT/EP2016/053022
§ 371 (c)(1),
(2) Date: Nov. 10, 2018

(87) PCT Pub. No.: WO2016/134983
PCT Pub. Date: Sep. 1, 2016

(65) Prior Publication Data
US 2019/0107161 A1 Apr. 11, 2019

(30) Foreign Application Priority Data

Feb. 26, 2015 (DE) ................ 10 2015 203 440

(51) Int. Cl.
*F16D 65/22* (2006.01)
*F16D 51/20* (2006.01)
(Continued)

(52) U.S. Cl.
CPC ............ *F16D 65/22* (2013.01); *F16D 51/14* (2013.01); *F16D 51/20* (2013.01); *F16D 2121/04* (2013.01); *F16D 2125/66* (2013.01)

(58) Field of Classification Search
CPC .......... F16D 65/22; F16D 51/14; F16D 51/20; F16D 2121/04; F16D 2125/66; F16D 55/08; F16D 55/14; F16D 55/16
See application file for complete search history.

(56) References Cited

U.S. PATENT DOCUMENTS 1,848,775 A 3/1932 Girling
1,968,667 A 7/1934 White
(Continued)

FOREIGN PATENT DOCUMENTS

DE 1475521 10/1965
DE 1600147 10/1966
(Continued)

OTHER PUBLICATIONS

European Patent Office; International Search Report; dated Apr. 5, 2016.

*Primary Examiner* — Melanie Torres Williams
(74) *Attorney, Agent, or Firm* — Price Heneveld LLP (57) ABSTRACT

A brake unit for use in utility vehicles includes an actuating element and a piston element, wherein the actuating element is displaceable along an actuation axis, wherein the piston element is displaceable along a piston axis and is secured against displacement transversely to the piston axis, wherein the actuation axis and the piston axis stand substantially transversely to each other, wherein the actuating element comprises an actuating face and wherein the piston element comprises a piston face, and wherein a plurality of roller bodies is arranged between the actuating face and the piston face for transmission of an actuating force between the actuating element and the piston element.

19 Claims, 5 Drawing Sheets

(51) Int. Cl.
*F16D 51/14* (2006.01)
*F16D 125/66* (2012.01)
*F16D 121/04* (2012.01)

(56) References Cited

U.S. PATENT DOCUMENTS

| | | | |
|---|---|---|---|
| 4,585,095 A | 4/1986 | Idel | |
| 6,305,506 B1 * | 10/2001 | Shirai | B60T 7/042 |
| | | | 188/136 |
| 6,986,411 B2 * | 1/2006 | Schautt | B60T 13/741 |
| | | | 188/343 |
| 2002/0108818 A1 | 8/2002 | Imoto et al. | |

FOREIGN PATENT DOCUMENTS

| | | |
|---|---|---|
| DE | 6607122 | 2/1967 |
| DE | 3717072 | 12/1988 |
| DE | 10336250 | 5/2004 |
| GB | 1148199 | 4/1969 |
| GB | 2143292 | 2/1985 |

* cited by examiner

BRAKE UNIT

BACKGROUND OF THE INVENTION

The present invention concerns a brake unit, in particular for use in utility vehicles.

Brake units are already known in the prior art in which an expansion wedge unit is used to move two brake shoes or brake linings relative to each other such that they come into engagement with the brake disc or a brake drum. In particular, the force-transmitting parts of the expansion wedge unit are exposed to high mechanical loads, wherein due to the relative movements taking place under slip friction between the various components, often a high wear occurs and also a high force is required for the actuating unit. It has proved useful to insert roller bodies between the parts of the expansion wedge unit which move relative to each other, such that instead of a sliding movement of the components, a rolling movement is possible and hence the wear on the force-transmitting faces is reduced. The solutions known from the prior art however have revealed the problem that very high surface pressures occur on the individual roller bodies, and hence surface damage results at the force-transmitting faces of the components which move relative to each other. It has furthermore proved problematical that, on a pivoting of the expansion wedge relative to the piston elements which apply force to the brake shoes in operation of the brake, high stress peaks occur which again cause increased material wear and a shorter service life of the expansion wedge units known from the prior art.

The object of the present invention is to provide a brake unit which eliminates the disadvantages known from the prior art and nonetheless allows simple and compact construction.

SUMMARY OF THE INVENTION

According to the invention, the brake unit comprises an actuating element and a piston element, wherein the actuating element is displaceable along an actuation axis, wherein the piston element is displaceable along a piston axis and is secured against displacement transversely to the piston axis, wherein the actuation axis and the piston axis stand substantially transversely to each other, wherein the actuating element comprises an actuating face and wherein the piston element comprises a piston face, wherein a plurality of roller bodies is arranged between the actuating face and the piston face for transmission of an actuating force between the actuating element and the piston element. The actuating element is advantageously the expansion wedge of an expansion wedge brake system, which has a rod-like portion via which a force from a brake force system, e.g. a brake cylinder, is received. Furthermore, the actuating element has a wedge-shaped portion on which an actuating face is provided. The actuating face serves for direct or indirect force transmission from the actuating element to the plurality of roller bodies. In this context, a plurality of roller bodies is defined as comprising at least two roller bodies. The roller bodies stand in direct or indirect engagement with the actuating element. The roller bodies transmit the force received by the actuating element to the piston element and in particular to a piston face of the piston element. Advantageously, the actuating face and the piston face are oriented relative to each other such that the resulting force transmitted to the piston element acts substantially along the piston axis. In other words, the force transmitted by the roller bodies directly or indirectly to the piston element preferably has its greatest force component parallel to the piston axis, preferably in the state of the brake unit in which this applies the highest braking force. Using the plurality of roller bodies acting between the piston element and the actuating element, the Hertzian surface pressure occurring at the corresponding rolling faces of the actuating element and/or piston element can be reduced. In this way furthermore, the surface wear, such as e.g. pitting or scuffing from the wear mechanism, can be significantly reduced. At the same time, the use of a plurality of, preferably at least two, roller bodies, allows the space required for the brake unit not to be enlarged despite the significantly reduced Hertzian surface pressure, but even to be reduced. The plurality of roller bodies is preferably used instead of a single roller body with a larger radius, which admittedly also achieves a reduced surface pressure but at the same time causes a significantly increased space requirement.

In a preferred embodiment, the roller bodies roll on a first running surface and on a second running surface, wherein the running surface planes are configured and arranged symmetrically to each other relative to a center plane, wherein the rotary axes of the roller bodies lie in the center plane. At least one of the running surfaces is preferably provided on the actuating face or on the piston face, wherein the other is preferably arranged on a further component or alternatively on the one of the actuating face or piston face which does not already carry the first running surface. The roller bodies are arranged between the running surfaces, wherein the rotary axes of the roller bodies lie in a center plane. In the case where the roller bodies move along a curved running surface, the center plane may also be formed as a curved face along which the rotary axes of the roller bodies move. Preferably, in each configuration of running surfaces and center plane, the running surfaces are configured to be planar symmetrical to each other relative to the center plane, i.e. in other words, a first vector standing orthogonal to and crossing the center plane has a specific length to its intersection with the first running surface, wherein the reciprocal of this vector on the respective opposite side of the center plane up to its intersection with the second running surface has precisely the same value as the first vector. In other words, two points lying orthogonally opposite each other relative to the center plane on the first and second running surfaces have the same distance from the center plane. With this configuration of the first running surface and the second running surface, it is possible that all roller bodies arranged between the running surfaces always participate in the force transfer between the actuating element and the piston element. In this way, advantageously, the forces acting on the individual roller bodies can be reduced and hence the surface pressure exerted by the roller bodies on the respective running surfaces can also be reduced.

Particularly advantageously, the first running surface is formed on an intermediate element, wherein the second running surface is formed on one of the elements of actuating element or piston element. The intermediate element is advantageously a component formed and produced separately from the piston element and actuating element. Particularly preferably, the intermediate element may be made of a hardened material which in particular is preferably harder than the material of the piston element and actuating element, whereby the wear between the roller body and the first running surface advantageously provided on the intermediate element can be significantly reduced. The intermediate element is in particular designed to arrange the first running surface planar symmetrically to the second running surface in every state of the brake unit, even if deformations occur on the actuating element or piston element from the forces acting in the brake unit. This in particular improves the effect of the plurality of roller bodies in reducing the Hertzian surface pressure on the first running surface and second running surface, by distributing the force transmission as evenly as possible over several roller bodies.

Particularly preferably, the intermediate element has a compensating face on its side lying opposite the first running surface, wherein the compensating face is formed curved at least in regions. The compensating face of the intermediate element is preferably the face with which the intermediate element lies either against the piston element or against the actuating element. The compensating face is simultaneously also a face with which the intermediate element transfers a force to the piston element or receives a force from the actuating element. The curvature of the compensating face in regions allows the intermediate element to pivot relative to the element which lies against the compensating face. Here, the curvature radius of the compensating face is preferably a multiple of the curvature radius of the roller bodies. In this way, the Hertzian surface pressure and resulting surface damage in the region of contact between the compensating face and the piston element or actuating element may be reduced to a minimum.

Furthermore, preferably, the intermediate element has an extension transversely to the piston axis, wherein the compensating face has a median curvature radius, wherein the ratio of the extension of the intermediate element to the median radius of the compensating face lies in the range from 0.03 to 0.3, preferably from 0.04 to 0.25, and particularly preferably approximately 0.04 to 0.09. In other words, particularly preferably, the curvature radius of the compensating face is a multiple of the extension of the intermediate element transversely to the piston axis. This large radius particularly preferably reduces the Hertzian surface pressure between the intermediate element and the corresponding piston element or actuating element in contact therewith. Furthermore, the curvature of the compensating face with a median curvature radius allows the intermediate element to pivot by rolling over the compensating face, in particular in order to compensate for production tolerances and a tilting of the actuating element relative to the piston element.

Preferably, the intermediate element lies against the actuating face or against the piston face and is configured such that it allows a swing or pivot movement of the actuating element relative to the piston axis with a swing angle from 1° to 8°, preferably from 2° to 6° and particularly preferably from around 2° to 4°. In particular under the high forces occurring in the brake unit, elastic material deformations can occur at the actuating element or piston elements, and at the regions of the housing of the brake unit holding the piston elements in position transversely to the piston axis. In order to be able to compensate for these pivot movements, it is preferred that the intermediate element allows a pivot movement of the actuating element relative to the piston axis in the range from ±1° to ±8°, while keeping the running surfaces of the roller bodies planar symmetrical to each other or preferably parallel to each other. In this context, it is understood that the swing angle may be applied both in one direction and also to the same amount in the opposite direction. The range of the swing angle from ±1° to ±8° allows optimum running of the roller bodies on the running surfaces even under particularly high forces and deformations occurring in the brake unit. Preferably, the swing angle is designed no larger than 8° since, in order to achieve this, in turn the median curvature radius of the compensating face must be selected smaller, whereby again the Hertzian surface pressure in the region of the compensating face would be increased. The particularly preferred range of the swing angle from 2° to 4° has proved suitable in particular in the field of drum brakes for utility vehicles, since all pivot or swing movements of the actuating element occurring therein can be compensated by an intermediate element configured in this way.

In a first preferred embodiment, the first running surface is provided on the intermediate element and the second running surface on the actuating element. The advantage of this embodiment is that the intermediate element can be fixed to the piston element, and hence the actuating element remains independent of the assembly of intermediate element and piston element, and may preferably be an integral part of a brake cylinder.

In an alternative embodiment, the first running surface is provided on the intermediate element and the second running surface on the piston element. This embodiment is advantageous since the intermediate element and the actuating element can be preassembled in order then to be inserted in the actuating unit. In this way, the installation cost for the brake unit can be reduced.

Particularly preferably, the two roller bodies furthest apart from each other and in engagement with both running surfaces have a rotary axis spacing, wherein on its side opposite the first running surface, the intermediate element has a force transfer region with a median force transfer point, wherein a triangle spanned between the rotary axis spacing and the median force transfer point has acute angles. In other words, a triangle spanned between the rotary axes of the two roller bodies which are in engagement with both running surfaces and are furthest apart from each other, and a median force transfer point, is configured such that none of the internal angles is greater than 90°. With this arrangement of the force transfer region relative to the force-transmitting roller bodies, it is possible to achieve a particularly good load distribution onto the individual roller bodies. In the optimum case, the force transfer point is oriented relative to the arrangement of roller bodies such that all roller bodies transmit substantially the same force. This state is advantageously achieved in the state of the brake unit in which the maximum actuating force is transmitted from the actuating element to the piston element and at the same time the maximum braking effect is achieved at the brake. In this way, at this force maximum, the forces transmitted by the individual roller bodies are distributed as evenly as possible and, in this way, both the wear on the roller bodies and the wear on the running surfaces can be minimized. Advantageously, the triangle spanned between the rotary axes and the median force transfer point is an isosceles triangle, wherein the equal legs of the triangle each run between a rotary axis or an end of the rotary axis spacing and the median force transfer point.

In a particularly preferred embodiment, the roller bodies are held in a cage. In this way, the positioning and even distribution of roller bodies between the running surfaces is improved. It is also achieved that even if, in certain states of the brake unit, individual roller bodies are not arranged between the running surfaces, these are not lost but held in position by the cage.

Advantageously, the maximum distance between two roller bodies is greater than the extension of the first running surface and/or the second running surface measured parallel to the center plane. In other words, this means that the maximum possible actuating travel of the actuating element may be greater than the extension of the first and/or second running surface parallel to the actuating direction. In this way, a highly compact structure may be selected for the actuating element, in particular the expansion wedge of the actuating element, and hence weight can be saved. At the same time, it is possible to use a specific expansion wedge in different-sized brake systems, since the assembly of roller bodies is able to guarantee a sufficiently large actuating travel even if one of the running surfaces is shorter than the actuating travel required.

Advantageously, the roller bodies form a needle roller bearing, wherein preferably at least four roller bodies, particularly preferably approximately seven to fifteen roller bodies are provided. It has proved advantageous that, the greater the displacement travel of the actuating element along the actuation axis in operation of the brake unit, the more roller bodies are advantageously used to form a needle roller bearing. In this way, even over the entire displacement movement of the actuating element, always a constantly high number of roller bodies can be arranged between the first running surface and the second running surface in order to transmit evenly a force from the actuating element to the piston element. At the same time, it has proved advantageous to use at least four roller bodies for a needle roller bearing, wherein this minimal configuration of the needle roller bearing in particular keeps the weight of the brake unit low.

Particularly preferably, the actuating force transmitted by the roller bodies has its greatest force component along or parallel to the piston axis. In this way, wear in the region of the guide of the piston element can be minimized. Advantageously, the piston element is guided in a recess of the housing of the brake unit which is preferably configured as an expansion wedge unit. In order to apply the minimum possible transverse force to this guide of the piston element, it is preferred that the greatest force component of the actuating force transmitted by the roller bodies acts substantially parallel to the piston axis.

Particularly preferably, the actuation axis stands substantially transversely to the piston axis. Substantially transversely to the piston axis in the present context means that minor tilting in the range of up to ±10°, preferably up to ±5° and particularly preferably up to ±3°, of the actuating element relative to the piston axis, is included. In a particularly preferred case, the actuation axis stands perpendicularly to the piston axis.

In a particularly preferred embodiment, the running surfaces are formed curved for guiding spherical or barrel-shaped roller bodies. This curvature of the running surfaces is preferably constant over the entire travel or rolling path of the roller bodies along the running surfaces, in order in particular to prevent local surface unevenness from causing stress peaks in the transmission of force from the roller bodies to the corresponding running surface. At the same time, the curved running surfaces allow guidance and stabilization of the roller bodies against displacement along their rotary axes.

In an alternative embodiment, the running surfaces are oriented parallel to each other and are preferably formed flat. In particular when cylindrical needles of a needle roller bearing are used as roller bodies, the running surfaces are formed as simple flat faces. The advantage of this embodiment is that such faces are much easier to produce them curved faces.

Preferably, the intermediate element is secured against displacement along the actuation axis relative to the piston element or relative to the actuating element. The intermediate element is thus preferably pivotable either on the actuating element or on the piston element, but held secured against displacement. Particularly preferably, here a form-fit engagement is suitable between a corresponding fixing geometry on the piston element or actuating element in which the intermediate element engages. The advantage of this feature is that the piston element and the intermediate element, or the actuating element and intermediate element, can be premounted as an assembly in order then to be installed in the brake unit. At the same time, the fixing of the intermediate element to the actuating element or piston element guarantees that, in operation of the brake unit, the intermediate element always remains at its intended location between the actuating element and the piston element.

BRIEF DESCRIPTION OF THE DRAWINGS

Further advantages and features of the present invention arise from the following description with reference to the attached figures. It is understood that individual features shown in only individual embodiments may also be used in other embodiments, unless explicitly excluded or prohibited for technical reasons. The drawings show.

DETAILED DESCRIPTION OF THE PREFERRED EMBODIMENTS

Figure 1:
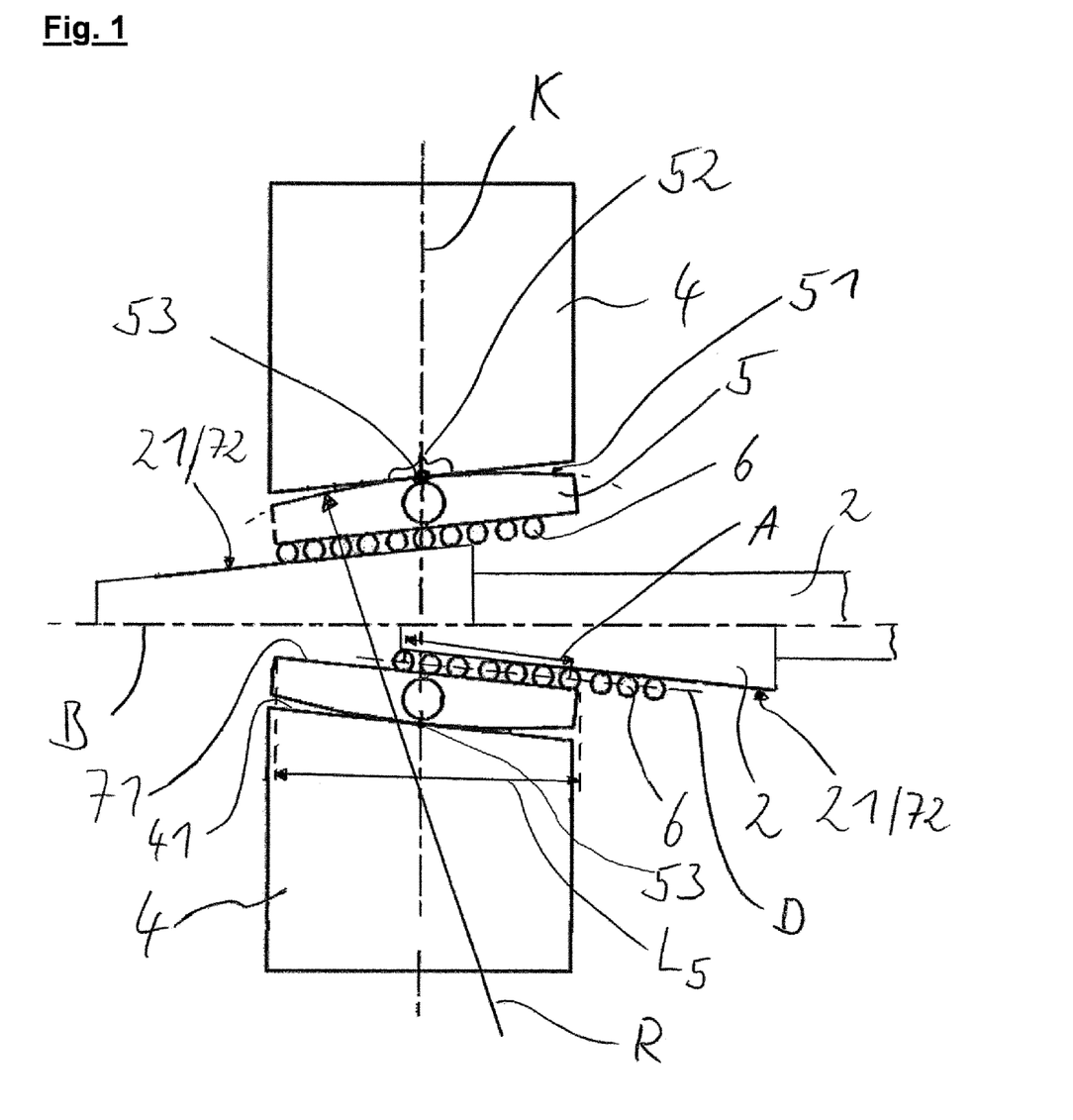
FIG. 1 a view of a first preferred embodiment of the brake unit according to the invention.

The brake unit in FIG. 1 has an actuating element 2 and a piston element 4. The figure depicts two states of the preferred embodiment of the brake system, separated by the actuation axis B arranged centrally. The state of the brake unit depicted above the actuation axis B is the state in which the actuating element 2 is retracted so far into the brake unit that its wedge-shaped geometry, in the portion of the piston element 4 shown on the left in the figure, is at its furthest from the actuation axis B. This state is in particular the state on application of the maximum braking force, in which the preferably two piston elements 4 are expanded to the maximum. The state of the brake unit shown in FIG. 1 below the actuation axis B is the state at the start of the braking process, in which the actuating element 2 has only moved to a minimal extent into the expansion wedge unit. This depiction of the brake unit has also been selected in FIGS. 2 and 3. It should be pointed out again here that, for space reasons, individual technical features in the figures are shown either on components in the state depicted above the actuation axis B or on components in the state depicted below the actuation axis B. This applies in particular to the median curvature radius R and the extension $L_5$ of the intermediate element 5 transversely to the piston axis K, the rotary axis spacing A and the center plane D, which are evidently present both in the upper and in the lower image halves of the respective figure. Also, the intermediate element 5 shown in the lower image half has a force transfer region 52 and a median force transfer point 53. The actuating element 2 has an actuating face 21 which preferably also forms the second running surface 72. Roller bodies 6 rest on the second running surface 72, and in the present case preferably form a needle roller bearing. In order to transmit force from the actuating element 2 to the piston element 4 via the roller bodies, preferably an intermediate element 5 is provided which has a first running surface 71. At the first running surface 71, the roller bodies 6 transmit a force from the actuating element 2 to the intermediate element 5 and vice versa. Furthermore, the intermediate element 5 has a compensating face 51 on its side facing away from the first running surface 71. The compensating face 51 is preferably formed curved with the median curvature radius R. The curvature radius R is substantially greater than the extension $L_5$ of the intermediate element 5 transversely to the piston axis K. Advantageously, on the compensating face 51, the intermediate element 5 has a force transfer region 52 with a median force transfer point 53. The median force transfer point 53 is here understood as a mathematical auxiliary value. Since FIG. 1 shows a sectional view of the preferred embodiment of the brake unit, evidently the median force transfer point 53 is preferably a straight line relative to the spatial depiction of the brake unit. Preferably, the rotary axes of the roller bodies 6 lie in the center plane D, wherein the first running surface 71 and the second running surface 72 are advantageously formed planar symmetrically to each other relative to the center plane D.

Figure 2:
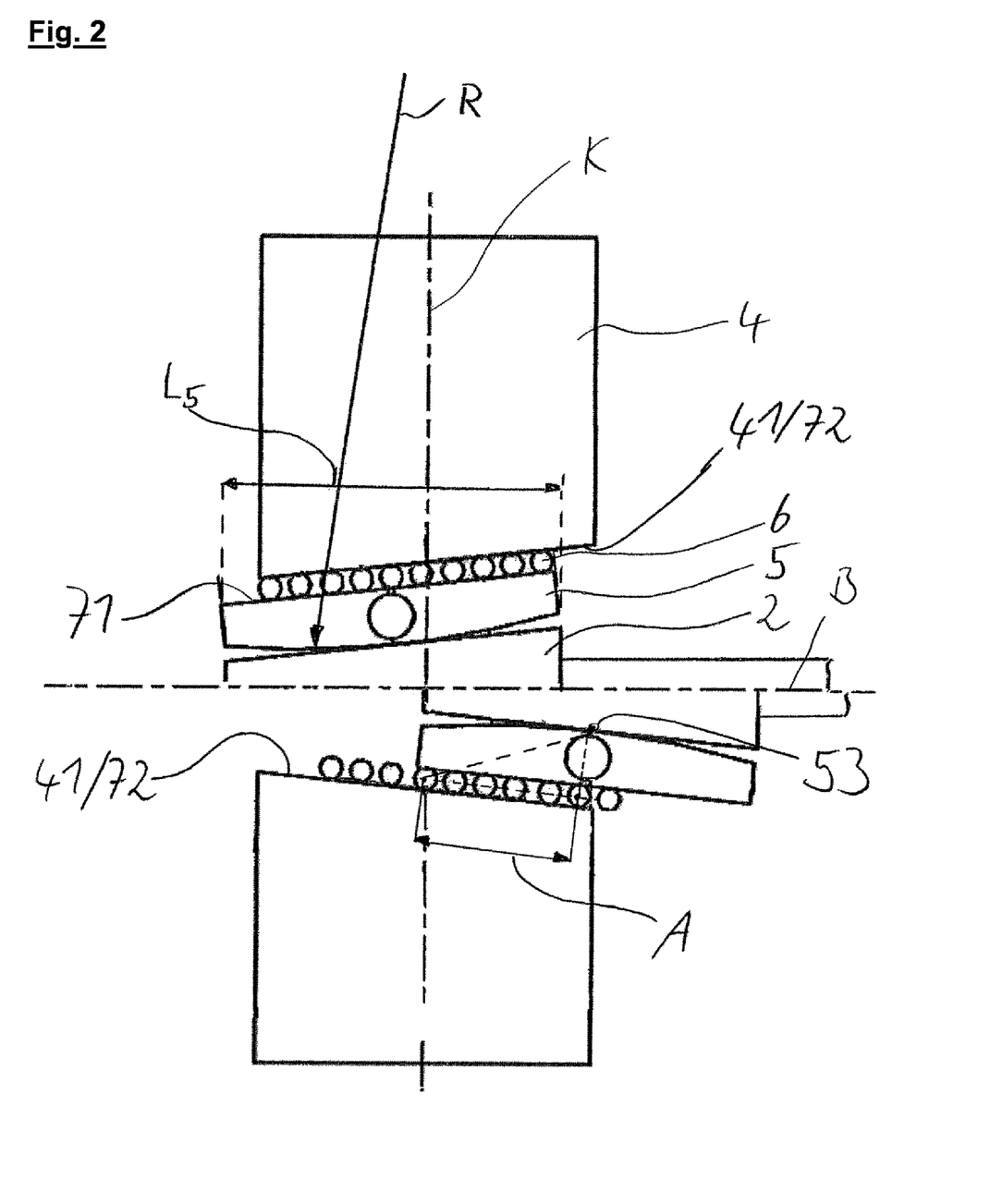
FIG. 2 a further preferred embodiment of the brake unit according to the invention.

FIG. 2 shows a further preferred embodiment of the brake unit according to the invention, wherein, in contrast to FIG. 1, the second running surface 72 is provided on the piston face 41. In this preferred exemplary embodiment, the intermediate element 5 together with the actuating element 2 is displaced along the actuation axis below the piston 4, whereby due to the oblique position of the piston face 41 or the second running surface 72, a displacement of the actuating element 2 along the actuation axis B causes a displacement of the piston element 4 along the piston axis K. The lower image half depicts the preferably acute-angled triangle between a median force transfer point 53 and a rotary axis spacing A. It is also evident that in the state of the brake unit shown below the actuation axis B, on initiation of the braking process and accordingly with only low forces acting between the actuating element 2 and the piston element 4, in total four of the roller bodies 6 are not arranged between the running surfaces 71, 72. These roller bodies 6 in this state do not contribute to the force transfer and are held in a cage. In this state of the brake unit, the second roller body 6 from the right in the figure transfers a higher force than the roller body 6 lying to its left. In the state of the brake unit shown at the top in the figure—which preferably occurs under a substantially higher brake force than in the state shown at the bottom of the figure—advantageously all of the roller bodies 6 are arranged between the running surfaces 71 and 72 for force transmission, wherein a triangle drawn between the median force transfer point 53 and the rotary axis spacing A in this state is preferably an approximately isosceles triangle. Thus a particularly even force distribution to the roller bodies 6 can be achieved. The cross sections of the actuating element 2, intermediate element 5, piston element 4 and roller bodies 6, are substantially equal to the cross sections of the corresponding components in the embodiment shown in FIG. 1.

Figure 3:
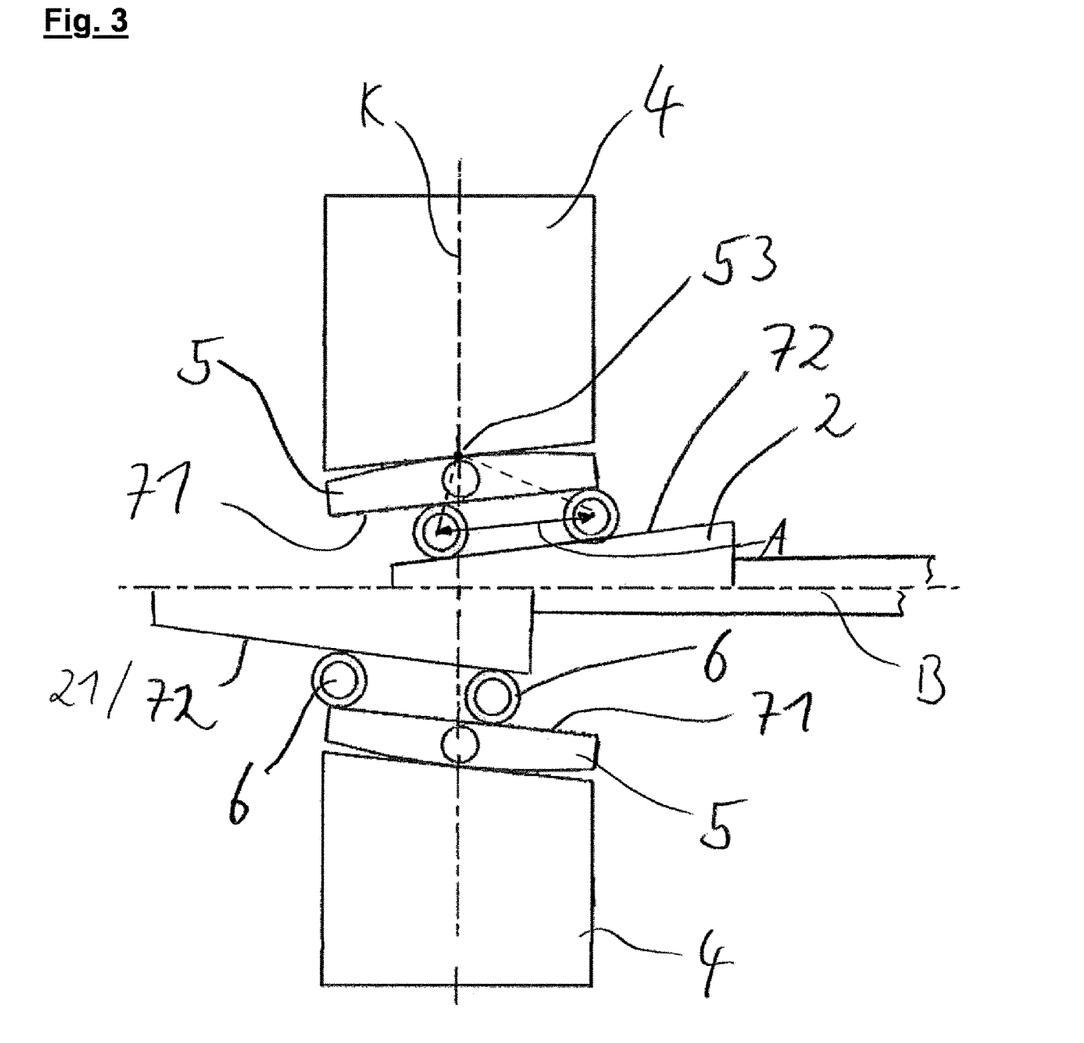
FIG. 3 a further preferred embodiment of the brake unit according to the invention.

FIG. 3 shows a further preferred embodiment which is substantially based on the embodiment shown on FIG. 1, wherein the roller body arrangement 6 configured as a needle roller bearing has been replaced by two roller bodies 6 with greater radius than in FIGS. 1 and 2. The advantage of the configuration of the brake unit with just two roller bodies 6 is that installation of the roller bodies is substantially simpler, and due to the greater diameter of the roller bodies 6 (in comparison with the needle rollers in FIGS. 1 and 2), also a relatively low surface pressure occurs between the corresponding running surfaces 71, 72 and the roller bodies 6. FIG. 3 again shows the preferred embodiment in which a triangle spanned between the rotary axis spacing A and the median force transfer point 53 is formed with acute angles. It is understood that the arrangement shown in FIG. 2 would also be possible with the roller bodies 6 shown in FIG. 3.

Figure 4:
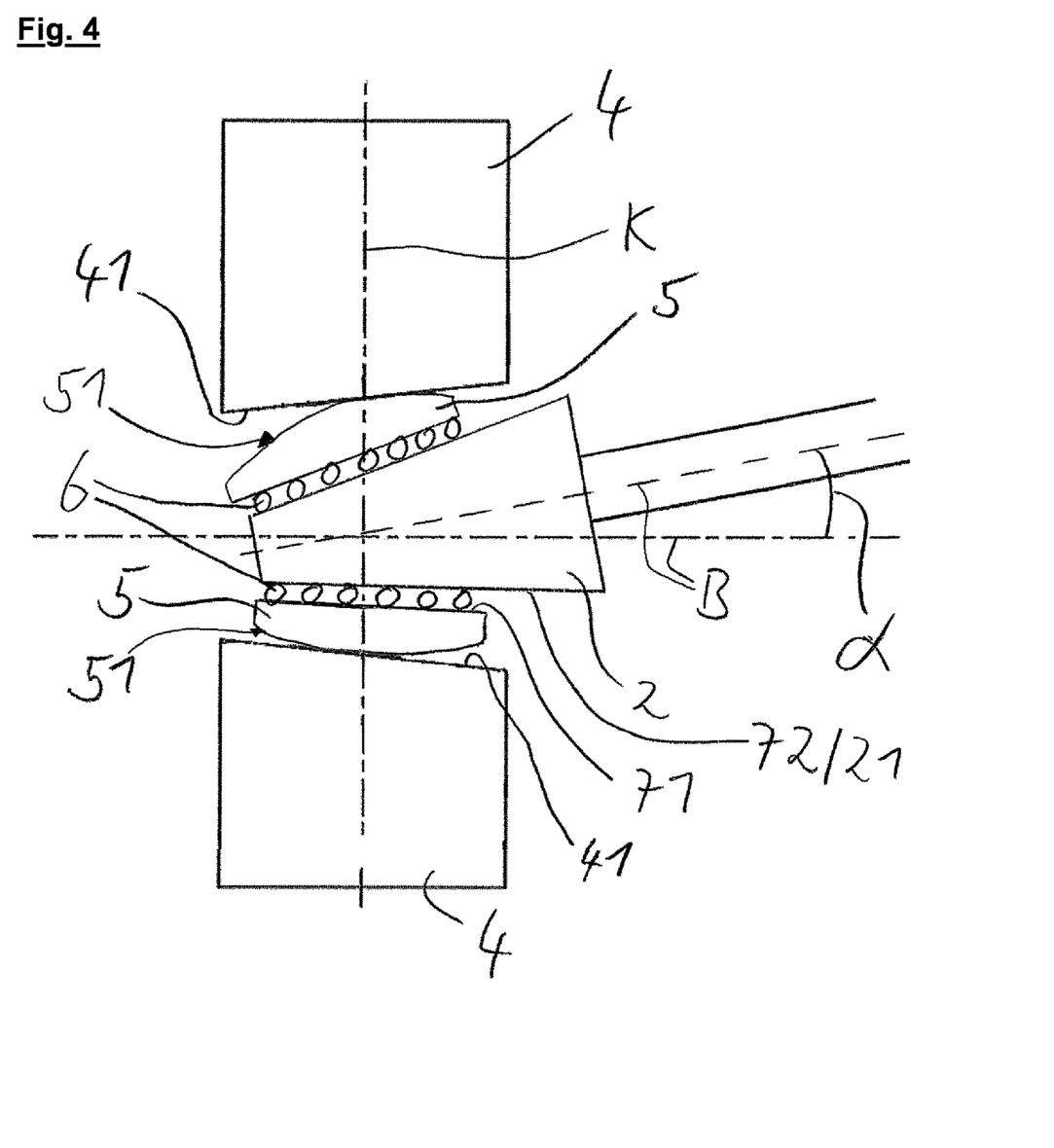
FIG. 4 a view of the preferred embodiment shown in FIG. 1 of the brake unit according to the invention FIG. 5 a view of a detail of a preferred embodiment of the brake unit according to the invention.

FIG. 4 shows the embodiment depicted in FIG. 1 of the brake unit according to the invention, wherein the actuating element 2 is tilted relative to the piston axis K. This tilting can be absorbed and compensated by means of the curved compensating face 51 of the intermediate element 5. Because of the capacity of the intermediate element 5 to compensate for the pivot movements of the actuating element 2 relative to the piston axis K, by rolling over the piston face 41 via its compensating face 51, the intermediate element 5 ensures that the first and second running surfaces 71, 72 always remain planar symmetrical to each other or preferably parallel to each other. In this way, the actuating element may pivot through a swing angle $\alpha$ of up to $\pm 8°$ without the running surfaces 71, 72 tilting relative to each other.

Figure 5:
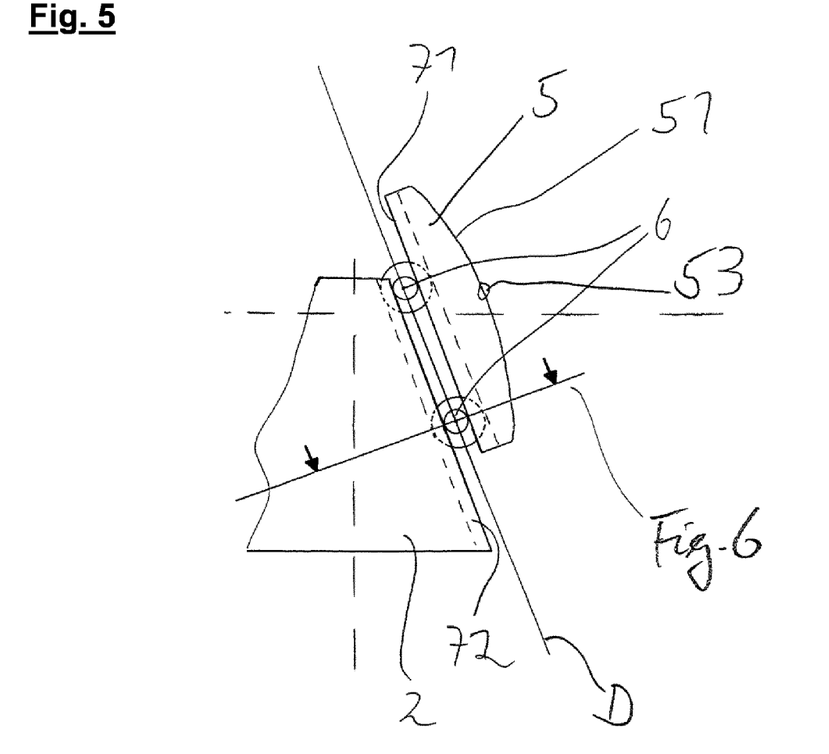
Figure 6:
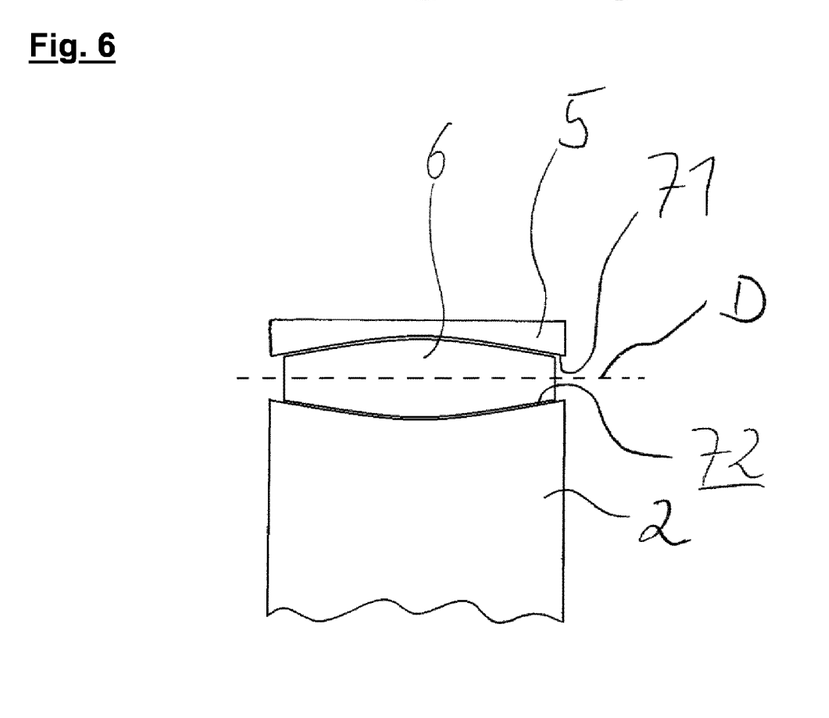
FIG. 6 a sectional view of the preferred embodiment shown in FIG. 5 of the brake unit according to the invention.

FIGS. 5 and 6 show a clarifying view of the position of the center plane D and a preferred embodiment of the first running surface 71 and second running surface 72, which in this example are formed curved. In particular in the view shown in FIG. 6, it is clear that due to the curved formation of the running surfaces 71 and 72, it is not possible for the roller bodies 6 to slip out of the space defined between the running surfaces 71, 72. In addition to the fact that, in all of the embodiments of FIGS. 1 to 6, the roller bodies 6 may be held by a cage, the embodiment depicted in FIGS. 5 and 6 provides additional stabilization of the roller bodies 6 in their optimal position for force transfer between the actuating element 2 and the piston element 4 (not shown).

REFERENCE SIGNS

2 Actuating element
21 Actuating face
4 Piston element
41 Piston face
5 Intermediate element
51 Compensating face
52 Force transfer region
53 Force transfer point
6 Roller body
71 First running surface
72 Second running surface
$\alpha$ Swing angle
A Rotary axis spacing
B Actuation axis
D Center plane
K Piston axis
$L_5$ Extension of intermediate element
R Median radius

The invention claimed is:
1. A brake unit for use in utility vehicles, comprising:
an actuating element; and
a piston element;
wherein the actuating element is displaceable along an actuation axis;

wherein the piston element is displaceable along a piston axis and is secured against displacement transversely to the piston axis;

wherein the actuation axis and the piston axis stand substantially transversely to each other;

wherein the actuating element comprises an actuating face and wherein the piston element comprises a piston face;

wherein a plurality of roller bodies is arranged between the actuating face and the piston face for transmission of an actuating force between the actuating element and the piston element;

wherein the roller bodies roll on a first running surface and on a second running surface;

wherein the first running surface is located on an intermediate element; and wherein the intermediate element lies at least one of against the actuating face and against the piston face, and is configured to allow at least one of swing movement and a pivot movement of the actuating element relative to the piston axis within an angle from 1° to 8°.

2. The brake unit as claimed in claim 1, wherein the running surfaces are configured and arranged planar symmetrically to each other relative to a center plane, and wherein rotary axes of the roller bodies lie in the center plane.

3. The brake unit as claimed in claim 1, wherein the second running surface is located on at least one of the actuating element and the piston element.

4. The brake unit as claimed in claim 1, wherein the intermediate element has a compensating face on a side of the intermediate element lying opposite the first running surface, and wherein the compensating face is curved at least in regions.

5. The brake unit as claimed in claim 4, wherein the intermediate element has an extension length transversely to the piston axis, wherein the compensating face has a median curvature radius, and wherein the ratio of the extension to the median radius is within the range from 0.03 to 0.3.

6. The brake unit as claimed in claim 5, wherein the ratio of the extension length to the median radius is within the range of 0.04 to 0.25.

7. The brake unit as claimed in claim 6, wherein the ratio of the extension length to the median radius is within the range of 0.04 to 0.09.

8. The brake unit as claimed in claim 3, wherein the intermediate element is configured to allow the at least one swing movement and the pivot movement of the actuating element relative to the piston axis within an angle of 2° to 6°.

9. The brake unit as claimed in claim 1, wherein the first running surface is located on the intermediate element and the second running surface is located on the actuating element.

10. The brake unit as claimed in claim 1, wherein the first running surface is located on the intermediate element and the second running surface is located on the piston element.

11. The brake unit as claimed in claim 3, wherein two roller bodies of the plurality of roller bodies furthest apart from each other and in engagement with both running surfaces have a rotary axis spacing, wherein on a side of the intermediate element opposite the first running surface, the intermediate element has a force transfer region with a median force transfer point, wherein a triangle spanned between the rotary axis spacing and the median force transfer point has acute angles.

12. The brake unit as claimed in claim 1, wherein the roller bodies are held in a cage.

13. The brake unit as claimed in claim 2, wherein a maximum distance between two roller bodies of the plurality of roller bodies is greater than at least one of the extension length of the first running surface and the second running surface measured parallel to the center plane.

14. The brake unit as claimed in claim 1, wherein the roller bodies cooperate to form a needle roller bearing.

15. The brake unit of claim 14, wherein the plurality of roller bodies includes at least four roller bodies.

16. The brake unit of claim 14, wherein the plurality of roller bodies includes between seven and fifteen roller bodies.

17. The brake unit as claimed in claim 1, wherein the running surfaces are at least partially curved and configured to guide at least one of spherical and barrel-shaped roller bodies.

18. The brake unit as claimed in claim 1, wherein the running surfaces stand parallel to each other and are substantially flat.

19. The brake unit as claimed in claim 1, wherein the intermediate element is secured against displacement along the actuation axis at least one of relative to the piston element and relative to the actuating element.

* * * * *